US011567905B2

(12) United States Patent
Sahin et al.

(10) Patent No.: US 11,567,905 B2
(45) Date of Patent: Jan. 31, 2023

(54) METHOD AND APPARATUS FOR REPLICATING A CONCURRENTLY ACCESSED SHARED FILESYSTEM BETWEEN STORAGE CLUSTERS

(71) Applicant: EMC IP HOLDING COMPANY LLC, Hopkinton, MA (US)

(72) Inventors: Adnan Sahin, Needham, MA (US); Ajay Potnis, Pune (IN)

(73) Assignee: Dell Products, L.P., Hopkinton, MA (US)

( * ) Notice: Subject to any disclaimer, the term of this patent is extended or adjusted under 35 U.S.C. 154(b) by 221 days.

(21) Appl. No.: 16/585,100

(22) Filed: Sep. 27, 2019

(65) Prior Publication Data

US 2021/0097032 A1 Apr. 1, 2021

(51) Int. Cl.
*G06F 16/18* (2019.01)
*G06F 16/182* (2019.01)
*G06F 16/17* (2019.01)
*G06F 16/176* (2019.01)

(52) U.S. Cl.
CPC ........ *G06F 16/1844* (2019.01); *G06F 16/173* (2019.01); *G06F 16/1767* (2019.01)

(58) Field of Classification Search
CPC . G06F 16/1844; G06F 16/173; G06F 16/1767
See application file for complete search history.

(56) References Cited

U.S. PATENT DOCUMENTS

| 9,043,530 | B1* | 5/2015 | Sundaram | G06F 3/0656 |
| | | | | 711/158 |
| 10,613,779 | B1* | 4/2020 | Brooks | G06F 3/061 |
| 2005/0021574 | A1* | 1/2005 | Miller | G06F 11/2046 |
| 2011/0191485 | A1* | 8/2011 | Umbehocker | H04L 63/0428 |
| | | | | 709/229 |
| 2012/0151164 | A1* | 6/2012 | Nayak | G06F 11/2094 |
| | | | | 711/162 |
| 2012/0260055 | A1* | 10/2012 | Murase | G06F 3/0665 |
| | | | | 711/165 |
| 2014/0195484 | A1* | 7/2014 | Wang | G06F 9/45558 |
| | | | | 707/624 |
| 2015/0248241 | A1* | 9/2015 | Goodman | G06F 12/02 |
| | | | | 711/114 |

(Continued)

*Primary Examiner* — Pierre M Vital
*Assistant Examiner* — Andrew N Ho
(74) *Attorney, Agent, or Firm* — Anderson Gorecki LLP

(57) ABSTRACT

A storage cluster includes a group of data nodes having concurrent access to a shared filesystem. The shared filesystem is assigned to a first TLU of a first storage group. Other filesystems of the data nodes associated with the shared filesystem, such as snapshot copies of the shared filesystems and the root/configuration filesystems of the data nodes are assigned to TLUs of a second set of storage groups. The first storage group and the second set of storage groups are all associated with a Remote Data Replication (RDR) group for the storage cluster. An RDR facility is created between a storage array storing the shared filesystem and a backup storage array. The concurrently accessed shared filesystem and the filesystems of all data nodes accessing shared filesystem are replicated on the RDR facility to the backup storage array to enable failover of the storage cluster between sites.

12 Claims, 7 Drawing Sheets

(56) References Cited

U.S. PATENT DOCUMENTS

| | | | |
|---|---|---|---|
| 2015/0355970 A1* | 12/2015 | Hayes | G06F 11/2069 714/6.23 |
| 2016/0057009 A1* | 2/2016 | Kadayam | H04L 41/0873 709/221 |
| 2016/0080489 A1* | 3/2016 | Ngo | H04L 67/1095 709/219 |
| 2016/0127462 A1* | 5/2016 | Mu | H04L 67/1097 709/219 |
| 2017/0083251 A1* | 3/2017 | Karale | G06F 3/067 |
| 2017/0235507 A1* | 8/2017 | Sinha | G06F 21/78 711/114 |
| 2019/0332293 A1* | 10/2019 | Miller | G06F 9/5016 |

* cited by examiner

METHOD AND APPARATUS FOR REPLICATING A CONCURRENTLY ACCESSED SHARED FILESYSTEM BETWEEN STORAGE CLUSTERS

BACKGROUND

This disclosure relates to computing systems and related devices and methods, and, more particularly, to a method and apparatus for replicating a concurrently accessed shared filesystem between storage clusters.

SUMMARY

The following Summary and the Abstract set forth at the end of this application are provided herein to introduce some concepts discussed in the Detailed Description below. The Summary and Abstract sections are not comprehensive and are not intended to delineate the scope of protectable subject matter which is set forth by the claims presented below.

All examples and features mentioned below can be combined in any technically possible way.

In some embodiments, a storage cluster includes a group of data nodes having concurrent access to a shared filesystem. The shared filesystem is assigned to a first TLU of a first storage group. Other filesystems of the data nodes associated with the shared filesystem, such as snapshot copies of the shared filesystems and the root/configuration filesystems of the data nodes are assigned to TLUs of a second set of storage groups. The first storage group and the second set of storage groups are all associated with a Remote Data Replication (RDR) group for the storage cluster. An RDR facility is created between a storage array storing the shared filesystem and a backup storage array. The concurrently accessed shared filesystem and the filesystems of all data nodes accessing shared filesystem are replicated on the RDR facility to the backup storage array to enable failover of the storage cluster between sites.

DETAILED DESCRIPTION

Shared filesystems enable multiple data nodes to mount the shared filesystem, thus providing parallel access to the shared filesystem to end users at multiple data nodes. Any user can connect to any data node and have access to the shared filesystem. To prevent conflicts between the data nodes, the data nodes may be organized into a storage cluster, in which one data node acts as the master and the other data nodes use the master to implement locks on portions of the shared filesystem being accessed by the data nodes.

While providing concurrent access to a shared filesystem thus makes the filesystem accessible to end users in parallel via multiple data nodes, this complicates failover when the shared filesystem becomes unavailable. Specifically, since the multiple data nodes of the storage cluster are independent nodes, if there is a problem with the storage system holding the concurrently accessed shared filesystem, failing over all of the data nodes of the storage cluster may disrupt concurrent access to the shared filesystem. Accordingly, this disclosure is based, at least in part, on the realization that replicating all of the data nodes of a storage cluster along with a shared filesystem concurrently accessed by the data nodes, would provide enhanced availability of the concurrently accessed shared filesystem during failover.

Figure 1:
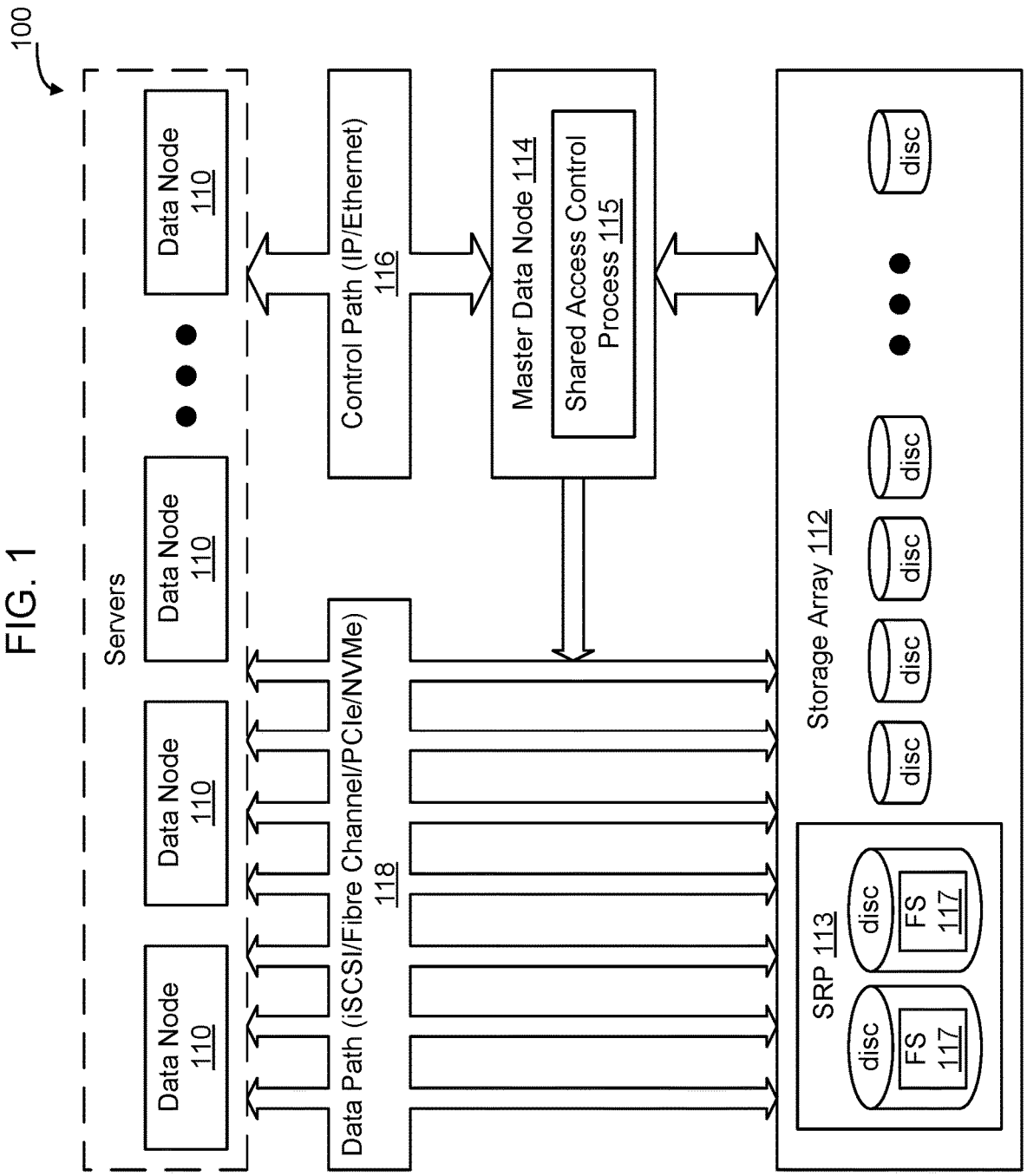
FIG. 1 is a functional block diagram of an example storage environment in which multiple data nodes of a storage cluster have concurrent access to a shared storage system, according to some embodiments.

FIG. 1 is a functional block diagram of an example storage environment 100 in which multiple data nodes 110 are implemented to have concurrent access to a shared filesystem 117 stored in storage resources (labeled discs in FIG. 1) of a storage array 112. One example technology that is designed to provide concurrent access to a shared filesystem is referred to as a Multi-Path Filesystem (MPFS) available from DELL/EMC. Other technologies may also be used to enable concurrent access to a shared filesystem 117.

In the storage environment 100 shown in FIG. 1, a cluster of data nodes 110 are implemented on servers, and have concurrent access to the shared filesystem 117 stored on storage array 112. In some embodiments, as discussed in greater detail below, each data node 110 implements a data management process (referred to herein as a Virtual Data Mover or VDM) that is used to by data clients that interface with the data nodes 110 to access the concurrently accessed shared filesystem 117. Because user filesystem 117 is shared across each of the data nodes 110, a data client such as an end user can connect to any of the data nodes 110 to access the shared filesystem 117. Using a shared filesystem of this nature, therefore, enables parallel Input/Output (IO) operations on the shared filesystem via any data node 110.

As used herein, the term "shared filesystem" is used to refer to a filesystem in which more than one data node 110 is able to perform IO operations on the filesystem. It should be understood that multiple data nodes 110 are not performing concurrent IO operations on the same area of the shared filesystem at the same time, since this would result in a conflict between the data nodes 110.

To prevent conflicts between data nodes 110, one of the data nodes 110 or a separate data node, is designated a master data node 114. Although FIG. 1 shows the master data node 114 as being separate from data nodes 110 for purposes of illustration, in other figures such as FIG. 3 the master data node 114 is shown as being implemented as one of the data nodes 110. Thus, it should be understood that the master data node 114 may also function as one of the data nodes 110 as well as performing control functions associated with control path 116 discussed below.

In some embodiments, for example in an embodiment configured to implement Multi-Path Filesystem (MPFS) from DELL/EMC™, metadata of the shared filesystem 117 flows over a control path 116 from the data nodes 110 to the master data node 114. The control path 116 may be implemented, for example, using an Internet Protocol (IP) network, ethernet network, or InfiniBand connection/fabric. The master data node 114 implements a control process 115 (also referred to herein as a cluster VDM 140, see FIG. 3), to coordinate access by the data nodes to the shared user filesystem 117. When one of the data nodes 110 needs to perform an IO operation on the concurrently accessed shared filesystem 117, the data node 110 sends a message on control path 116 to master data node 114 requesting a range lock on a portion of the shared user filesystem 117, to prevent conflicting concurrent IOs by multiple data nodes 110 on the same portion of the user filesystem 117 at the same time.

Actual IOs on the shared user filesystem 117 are performed by the data nodes 110 directly on the storage array 112 over a data path 118. The data path may be implemented using a data access protocol, such as iSCSI or Fibre Channel. In an environment where the storage array 112 is implemented using Non-Volatile Memory (NVM) media such as NAND-based flash, or higher performing Storage Class Memory (SCM) media technologies such as 3D XPoint and Resistive RAM, the data path may be implemented using Non-Volatile Memory Express (NVMe), which defines a set of standards that define a PCI Express (PCIe) interface that is configured to efficiently access data storage based on NVM media. Optionally, the data path 118 may be implemented using InfiniBand connection or fabric between the servers and a disc array enclosure implementing the storage array 112. Numerous types of technology may be used to implement the data path 118 that is used to pass data between the data nodes 110 and storage array 112.

Figure 2:
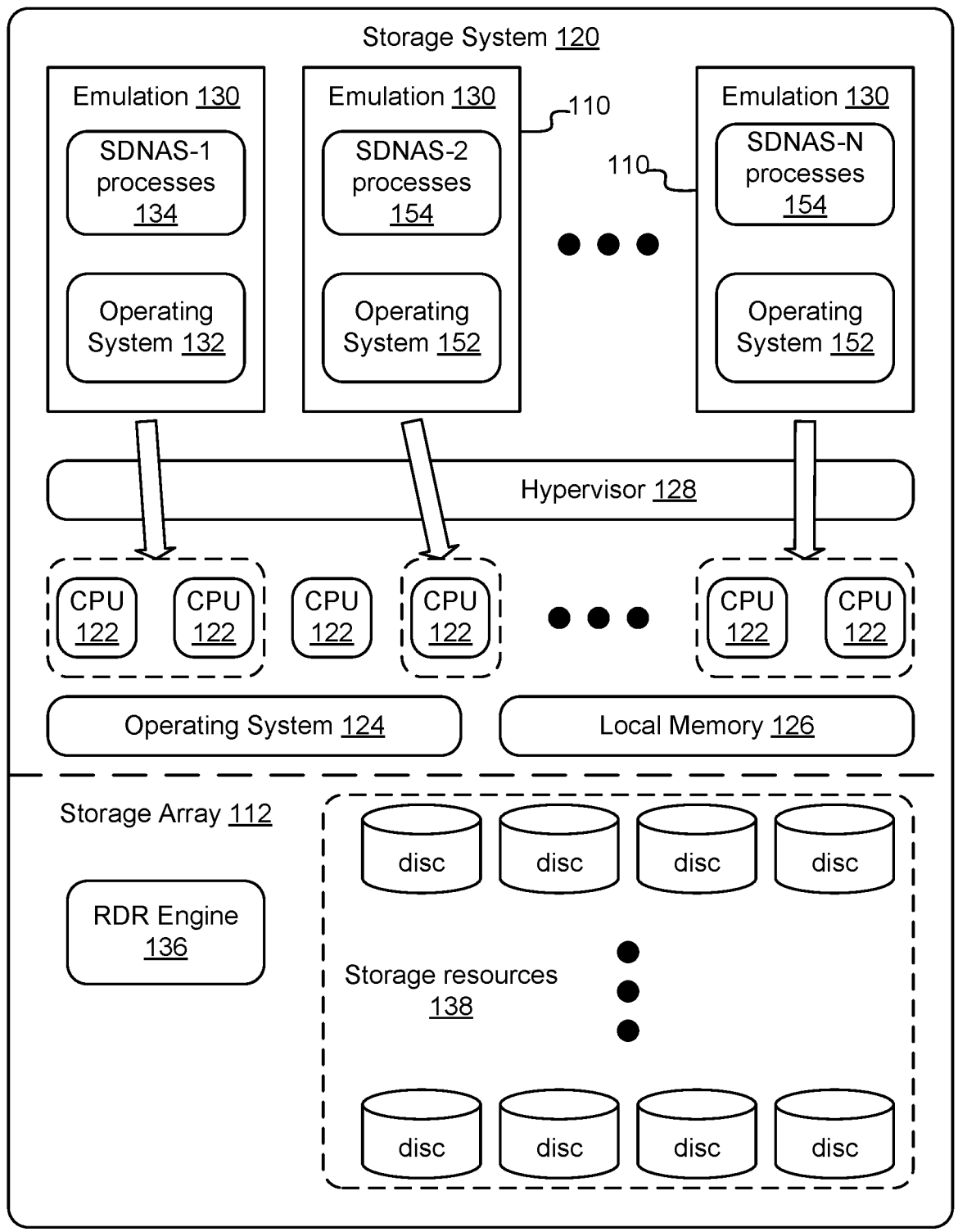
FIG. 2 is a functional block diagram of an example storage system for use in the storage environment of FIG. 1, according to some embodiments.

FIG. 2 is a functional block diagram of an example storage system 120 for use in the storage environment 100 of FIG. 1. As shown in FIG. 2, in some embodiments the storage system 120 implements one or more of the data nodes 110 with concurrent access to the shared user filesystem 117 stored in storage array 112. Not all of the data nodes 110 with concurrent access to the shared user filesystem 117 are required to be implemented in a single storage system 120, and different data nodes 110 may be instantiated on separate storage systems 120.

The storage system 120 shown in FIG. 2 has physical resources including a number of CPU processor cores 122, operating system 124, local memory 126, and other physical resources. Storage array 112 may be integrated and part of storage system 120 or may be implemented as a separate disk array enclosure that is able to be accessed by one or more storage systems 120.

A hypervisor 128 abstracts the physical resources of the storage system 120 from emulations 130, and allocates physical resources of storage system 120 for use by the emulations 130. Each emulation 130 has an emulation operating system 132 and one or more application processes 134 running in the context of the emulation operating system 132. As shown in FIG. 2, in some embodiments, one or more of the emulations 130 instantiated on storage system 120 implements one or more of the data nodes 110 of the storage cluster with concurrent shared access to the shared filesystem.

In some embodiments, each data node 110 is implemented using a Software Defined Network Attached Storage (SD-NAS) processes 134 instantiated in emulation 130. Although the embodiment shown in FIG. 2 has multiple data nodes 110 implemented as SDNAS processes, not all data nodes 110 are required to be implemented in the same storage system 120. Rather, multiple storage systems 120 with access to storage array 112 may be used to implement the set of data nodes 110 that provide concurrent access to shared user filesystem 117 stored on the storage array 112.

Storage system 120 or storage array 112, in some embodiments, implements on a Remote Data Replication engine 136 configured to cause subsets of data stored within storage resources 138 of storage array 112 to be mirrored in real time (as I/Os occur) by the storage array 112 to one or more similar backup storage arrays 112. One example Remote Data Replication technology is used by EMC/Dell™ and referred to as Symmetrix Remote Data Facility, also referred to as SRDF or RDF. However, implementations are not limited to an implementation that uses SRDF as the remote data replication technology, as other synchronous or asynchronous remote data replication technologies and remote replication techniques may be used as well.

It is possible for a primary storage array 112 (R1) to perform data replication to a backup storage array 112 (R2) where the storage systems 120 are compatible and properly configured. The RDR application 136, when executed on storage system 120, enables the storage array 112 to participate in storage system level data replication between sets of mirroring pairs of storage systems 120. A set of storage arrays 112 that are configured for data to be mirrored from a primary storage array 112 (R1) to a backup storage array 112 (R2) will be referred to herein as a "Remote Data Replication Facility". A given storage system, such as storage system 120, may operate as a primary storage array R1 or backup storage array R2 in many mirroring pairs, and hence multiple RDR applications 136 may simultaneously execute on storage system 120 to control participation of the storage array 112 in the mirroring operations of multiple remote data replication facilities.

Data transfer among storage systems 120, including transfers between storage arrays 112 for data replication (mirroring) functions, may take place in several ways depending on how the primary storage system handles data written by the data client 110 and how the backup storage system acknowledges receipt of data on the remote data replication facility. Two example data mirroring modes will be referred to herein as synchronous (SYNC) and asynchronous (ASYNC). Where data transfers occur between storage arrays 112, data transfer can take place over a communication network connecting the storage arrays 112, such as a Fibre Channel network or an Internet Protocol (IP) network.

In synchronous RDR data replication mode, to maintain the synchronous relationship between the primary storage array R1 and the backup storage array R2, each IO from each of the data clients 110 is forwarded by the primary storage array R1 to the backup storage array R2 as it is received from data client 110, and the primary storage array R1 will wait for an acknowledgment from the backup storage array R2 before issuing a subsequent IO from the data client 110.

In an asynchronous RDR data replication mode, when data is received from one of the data clients 110, the data is written to the primary storage array R1 and a data transfer process is initiated to write the data to the backup storage array R2 on the remote data replication facility. The primary storage array R1 acknowledges the write operation to the data client 110 before the primary storage array R1 has received an acknowledgement that the data has been received by the backup storage array R2. The use of asynchronous data replication enables the data on the primary storage array R1 and backup storage array R2 to be one or more cycles out of synchronization, because the primary storage array R1 will continue to execute IOs prior to receipt of acknowledgments from the backup storage array R2. The use of asynchronous replication may be beneficial in connection with sites located geographically distant from each other, for example where the distance between the primary storage array R1 and the backup storage array R2 is such that waiting for an acknowledgement from the backup storage array R2 would take considerable time and, hence, reduce responsiveness of the primary storage array R1 to the data client 110.

In some embodiments, as discussed in greater detail below, all filesystems associated with each of the data nodes of the storage cluster and the concurrently accessed shared user filesystem 117 are grouped into storage groups, and the set of storage groups associated with the storage cluster are placed in a single RDR group 152 (see FIGS. 3-4). As shown in FIG. 5, the storage system 112 uses the RDR engine 136 to mirror the data contained in the RDR group 152 from the primary storage array 112 (R1) to a backup storage array 112 (R2).

For a concurrently accessed shared user filesystem 117, each time one of the data nodes 110 accesses a portion of the concurrently accessed shared user filesystem 117 (or other filesystems associated with the data nodes 110 that are included in the RDR group 152), the RDR engine mirrors the changes to data contained in the RDR group from the primary storage array R1 to the backup storage array R2. This enables the entire storage cluster to be replicated from the primary storage array R1 to the backup storage array R2. In the event of failover, the backup storage array R2 can be changed from READ ONLY to READ/WRITE to enable continued access by the data clients on the same set of data nodes 110 on the backup storage array 112 to thereby accelerate failover of the concurrently accessed shared filesystem.

Figure 3:
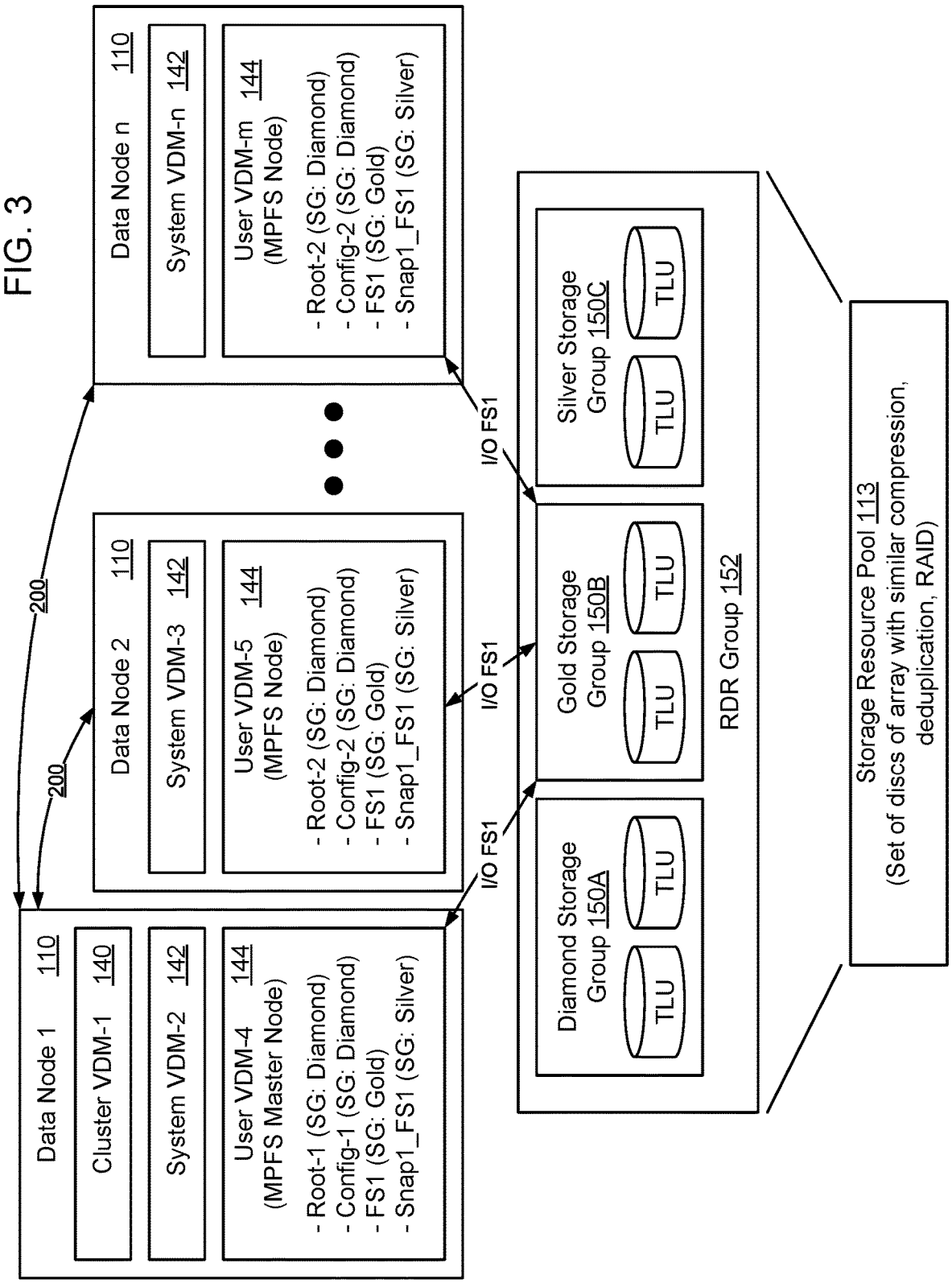
FIG. 3 is a functional block diagram of an example storage cluster of data nodes having concurrent access to a shared filesystem, according to some embodiments.
Figure 4:
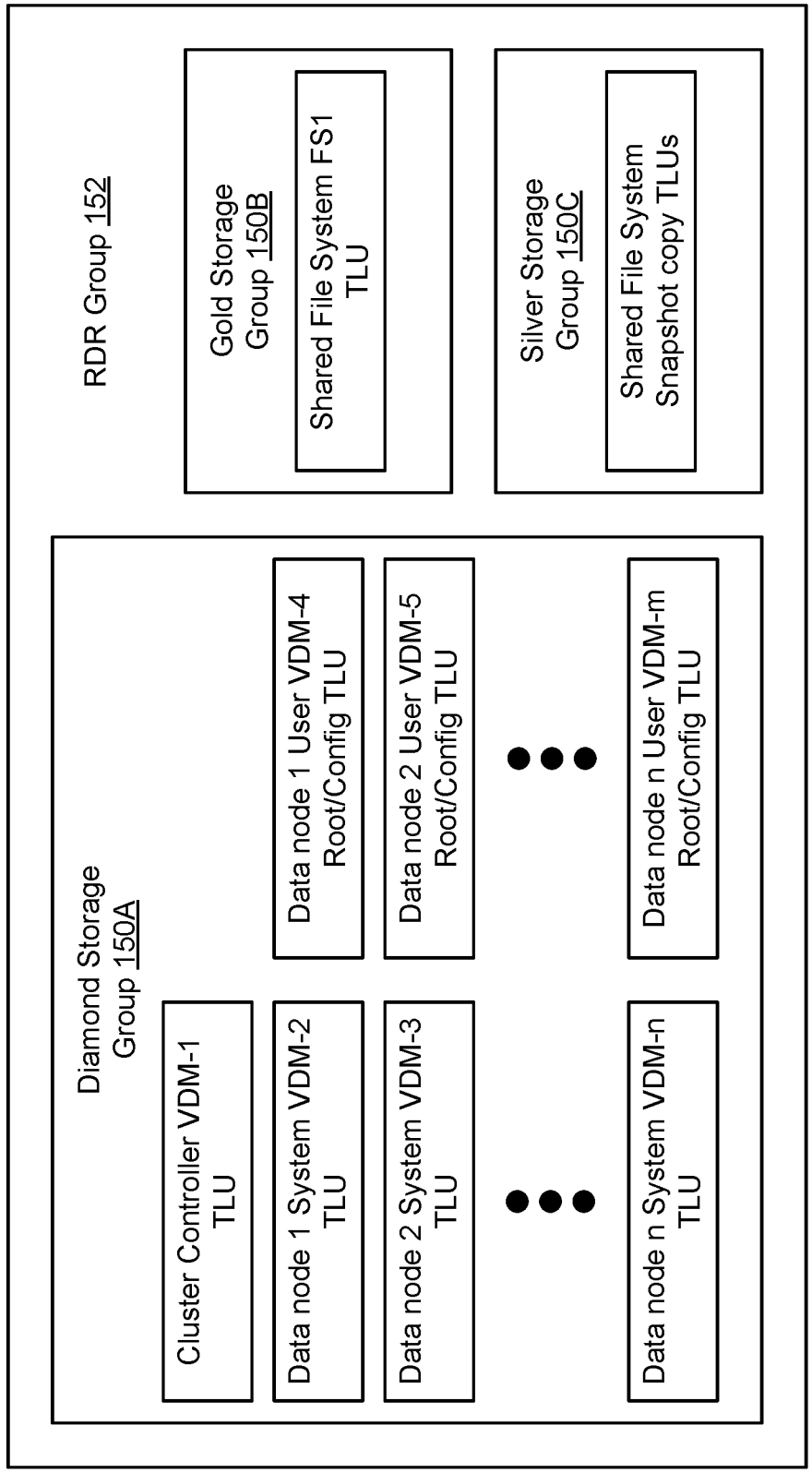
FIG. 4 is a functional block diagram of a Remote Data Replication (RDR) group for use in replicating the concurrently accessed shared filesystem between storage clusters.
Figure 5:
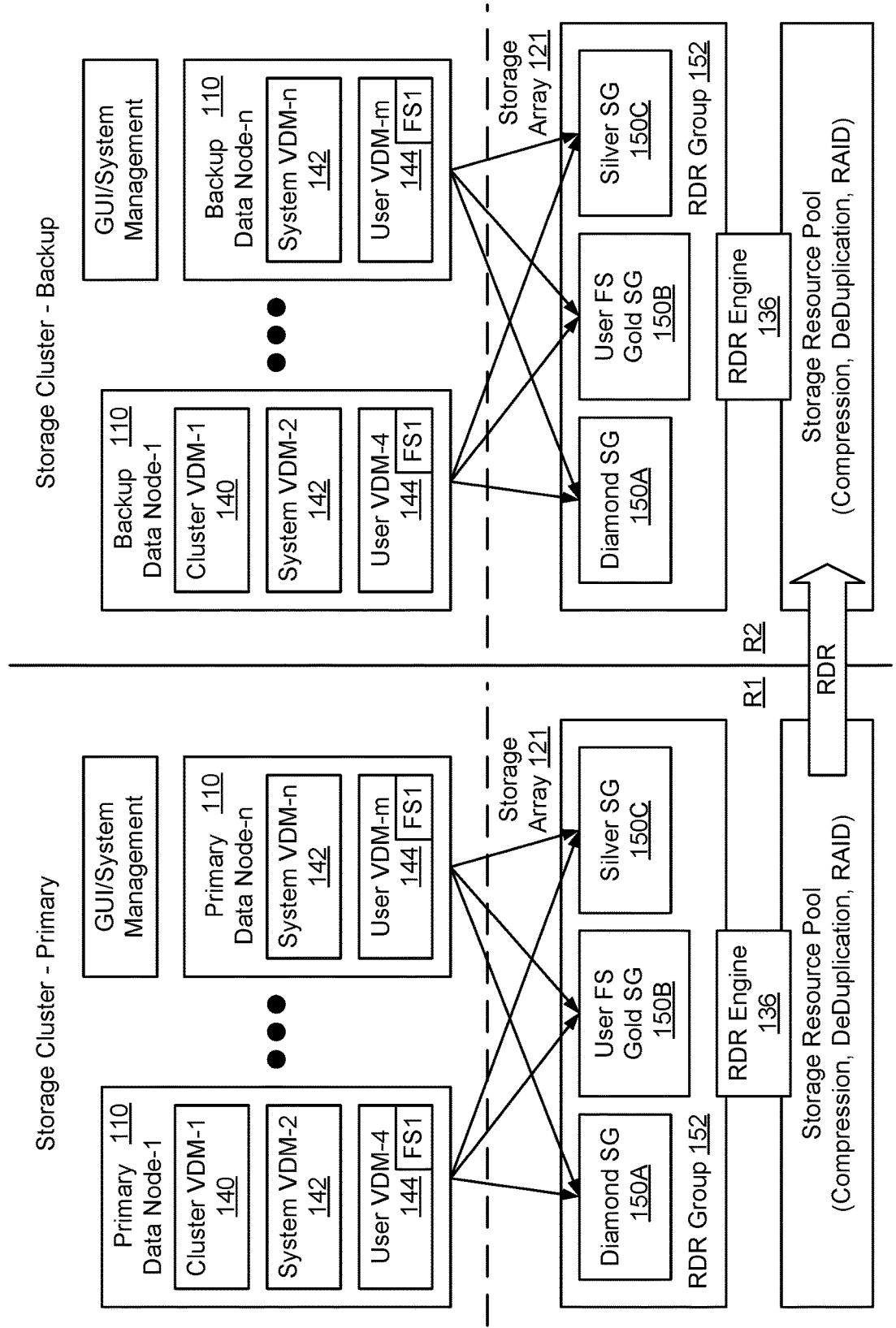
FIG. 5 is a functional block diagram of an example storage environment in which Remote Data Replication process is used to replicate the concurrently accessed shared filesystem between storage clusters, according to some embodiments.

FIG. 3 shows a cluster of data nodes having concurrent access to a shared user filesystem, which is labeled "FS1" in FIGS. 3-5. As used herein, the term "cluster" is used to refer to a group of two or more data nodes 110 that have concurrent access to a shared user filesystem. As shown in FIGS. 3-5 and discussed in greater detail below, in some embodiments all TLUs used by the data nodes of the storage cluster are grouped into storage groups 150 that are associated with the RDR group 152 for the shared filesystem 117.

In FIG. 3, data node 1 is the master data node 114. Specifically, as shown in FIG. 3, data node 1 includes a cluster Virtual Data Mover (Cluster VDM) 140 controlling membership in the storage cluster. The cluster VDM defines which data nodes 110 are part of the storage cluster and which user VDMs implemented on the data nodes 110 are part of the storage cluster. In some embodiments, the cluster VDM 140 also implements the shared access control process 115, although in other embodiments the shared access control process 115 may be implemented as a separate process on the master data node 114.

Data nodes 1-n are data nodes in the storage cluster, and have concurrent access to shared user filesystem FS1. Accordingly, a user can connect to any data node (data node 1-n) to mount the user filesystem FS1. A given storage system 120 may have emulations functioning as nodes in multiple storage clusters. As such, the storage cluster only includes emulations that are designated by the cluster VDM 140 to be included in the storage cluster to provide concurrent access to shared filesystem FS1.

Each data node has a system VDM 142, and one or more user VDMs 144. Each user VDM 144 has a VDM root filesystem and a VDM configuration filesystem. The VDM configuration filesystem includes a SDNAS database describing how the data of the VDM root filesystem and user filesystems are stored in underlying storage resources of the storage array 112. Although the example data nodes in FIG. 3 are shown as each having a single user VDM 144, in practice each data node may have multiple user VDMs 144. Likewise, although each user VDM 144 in FIG. 3 shows the user VDM containing a single user filesystem (the shared user filesystem FS1), in practice the user VDMs 144 of FIG. 3 may contain multiple user filesystems, each of which may be concurrently accessible shared filesystems or some of which may be user filesystems that are accessible only by a particular data node 110.

In some embodiments, the storage system 120 presents storage volumes as Thin Logical Units (TLU) 170. A TLU is a logical construct which enables the physical storage resources 138 of the storage system 120 to be abstracted from the data nodes 110. A logical unit is "thin", as that term is used herein, when actual physical resources 138 are only allocated to the TLU as needed. For example, a TLU may be presented to the data application 110 as having an available size of 1 TB (Tera-Byte). However, if the filesystem stored in the TLU is only 0.5 TB in size, the storage system 120 will only allocate 0.5 TB of physical storage resources 138 to the TLU. Thus, the amount of physical storage resources 138 allocated to a TLU will increase and decrease over time as the amount of data stored on the TLU changes over time. Within the physical storage resources, Data Devices (TDATs) are used to store the data, in which a given TDAT may be formed of a redundant group of physical disk drives, i.e. a TDAT may be formed from a RAID group of disk drives that store blocks of data within the storage array 112.

TLUs are allocated physical storage resources 138 based on intended service level objectives for the data contained in the filesystem maintained by the TLU. Different storage resources 146 may have different IO characteristics, and storage groups 150 are created from storage resource pools 113 (see FIG. 1) of storage resources 138 to enable the storage group to meet the intended service level objective. As noted above, a given VDM may manage multiple filesystems associated with the shared user filesystem FS1. The different user filesystems may require different service level objectives and, accordingly, the filesystem TLUs 170 may be located in different storage groups 150.

Data managed by the user VDM is stored in Thin Logical Volumes (TLUs) which are presented by the underlying storage array 112. TLUs are associated with storage groups 150. Different storage groups 150 may have different storage policies, which define the service levels provided by the storage array for data stored in TLUs associated with the storage group 150. Example service levels may include the expected average response time for an IO operation on the TLU, the number of IO operations that may be performed on a given TLU by a particular data client 110 or set of data clients 110, and other similar parameters. TLUs may be moved from one storage group to another, but belong to at most one storage group at a given point in time.

Each storage group 150 is allocated storage resources 138 from the storage array 112. In some embodiments, the storage resources in the storage array that have similar compression, deduplication, and RAID protection schemes, are grouped into storage resource pools, and resources from the storage resource pools are used to implement the storage groups. A storage resource pool may contain multiple storage groups, but resources from at most one storage resource pool are used as the underlying storage for a given storage group.

According to some embodiments, a set of storage groups 150 used to implement a storage cluster having concurrent access to a shared filesystem, are used to form a Remote Data Replication group. A single RDR instance is then implemented on the storage array 112 to replicate all storage groups associated with the concurrently accessed shared filesystems from one storage cluster to a second cluster. For example, in FIG. 3, the shared user filesystem that is accessed by data nodes 1-n has filesystems stored in diamond, gold, and silver storage groups. Accordingly, as shown in FIGS. 3 and 4, a single RDR group 152 is formed to include the diamond storage group 150A, gold storage group 150б, and silver storage group 150C. If the data nodes of the storage cluster have TLUs allocated out of additional storage groups, those additional storage groups would likewise be included in RDR group 152. The RDR process 136 then forms an RDR facility with another storage system 120 to cause all files associated with the storage cluster having concurrent access to the shared filesystem to be replicated to the remote storage array. In this manner, storage cluster is able to be replicated from a primary storage system to a backup storage system 120, to facilitate failover of the concurrently accessed shared filesystem.

FIG. 3 shows the storage cluster in greater detail, and FIG. 4 shows the RDR group in greater detail. As shown in FIG. 3, data node 1 includes user VDM-4, which has a root filesystem (Root-1) and a configuration filesystem (Config-1). The root and configuration filesystems of VDM-4 are allocated TLU which is included in Diamond storage group 150A. This TLU is labeled "Data node 1 User VDM-4 Root/Config TLU" in FIG. 4. Data nodes 2-n similarly have root and configuration filesystems that are stored in TLUs in Diamond storage group 150A, which are labeled "Data node 2 User VDM-5 Root/Config TLU" . . . "Data node n User VDM-m Root/Config TLU" in FIG. 4.

The concurrently accessed shared user filesystem (FS1) is allocated to be stored in the Gold storage group 150B, as indicated in each of the user VDMs shown in FIG. 3. In FIG. 4, the TLU allocated to the concurrently accessed shared user filesystem FS1 is labeled "Shared Filesystem FS1 TLU".

In addition to using RDR to mirror the storage group from a primary storage array R1 to a backup storage array R2, it is possible to protect the data contained in the concurrently accessed shared filesystem FS1 by creating snapshot copies (point in time copies) of the concurrently accessed shared user filesystem FS1. In an embodiment where snapshot copies of the concurrently accessed shared user filesystem are created, these snapshot copies may be allocated to the same storage group that is used to hold the TLU of the shared filesystem FS1, or may be allocated to a different storage group. In FIGS. 3-4 the snapshot copies are shown as being allocated to be stored in the Silver storage group 150C. The TLUs assigned to hold snapshot copies of the shared user filesystem are labeled in FIG. 4 as "Shared Filesystem Snapshot Copy TLUs".

Each of the other nodes has a similar configuration in which its root and configuration filesystems are stored in the Diamond storage group 150A, the concurrently accessed shared user filesystem FS1 is allocated to be stored in the Gold storage group 150B, and snapshot copies of the concurrently accessed shared user filesystem FS1 are allocated to be stored in the Silver storage group 150C. In other embodiments, different data nodes 110 may use TLUs allocated from different storage groups to store the root and configuration filesystems, and/or the snapshot copies of the concurrently accessed shared user filesystem FS1. Any storage group used by any of the data nodes that has concurrent access to the shared user filesystem FS1 is included in RDR group 152.

In some embodiments, the data nodes of a given storage cluster will have TLUs assigned from a relatively small number of storage groups, such as 8-10 storage groups. The installation will create some TLUs used by the system VDMs and these will come out of the default diamond service group. The same service group used by the user filesystems can be used by snap TLUs also. The user can select a different SLO to which the newly created filesystem will belong. Each storage group will collect multiple TLUs across the VDMs and nodes, as long as the filesystem properties required are the same, since a given storage group can have only one type of SLO and other properties. A set of TLUs can be combined together to form a storage group. One or more storage groups can be collected to from an RDR group 152 for the storage cluster.

FIG. 5 is a functional block diagram showing the use of Remote Data Replication by the storage array 112 to replicate the storage cluster, including all storage groups 150 used by all data nodes of the storage cluster that have concurrent access to the shared filesystem 117. In FIG. 5, a primary storage cluster is shown on the left-hand side, and a backup storage cluster is shown on the right-hand side. The two storage clusters may be geographically separated, if desired, for example by having the primary storage cluster in Massachusetts and the backup storage cluster in California, although any two locations may be used to implement the primary and backup storage clusters.

As shown in FIG. 5, in some embodiments one of the data nodes of the storage cluster implements a cluster VDM, and each data node implements a system VDM and a user VDM. On the primary site (left side of FIG. 5) each user VDM provides access to the shared user filesystem FS1. All files associated with the user VDMs that provide access to the shared user filesystem FS1 (discussed above in connection with FIG. 304) are stored in storage groups 150A, 150B, 150C associated with RDR group 152. The storage array 121 implements a Remote Data Replication engine 136, which copies data contained in the RDR group 152 from the storage array 121 on the primary site R1 to a storage array 121 on the backup site R2.

The data that is copied from the primary array 121 to the backup array 121 includes the system VDM filesystems, root and configuration filesystems of each data node's user VDM, as well as the concurrently accessed shared user filesystem FS1. This enables the backup site to have not only a complete copy of the concurrently accessed shared filesystem FS1, but also enables each of the data nodes of the storage cluster to be recreated at the backup storage cluster. Specifically, this enables the entire cluster to be recreated on the backup site. Even where the data nodes implementing the storage cluster are located on separate storage systems, by having the storage array implement copying of the data associated with the shared user filesystem FS1, it is possible to keep both the primary and secondary side configurations homogeneous, to keep the architecture and implementation simple, while achieving high reliability and minimize the amount of time it takes to failover from the primary to the backup site.

By using the RDR capabilities of the storage array 112, and destination mode of SDNAS secondary side, it is possible to have all of the objects on the backup site in a READ ONLY state already instantiated in memory. When replication failover is required, the only steps are in memory state changes from READ ONLY to READ WRITE. This avoids doing any write enable on the secondary devices, and also removes the need of doing a scan as the devices on the secondary site are already scanned and ready on the secondary site.

Figure 6:
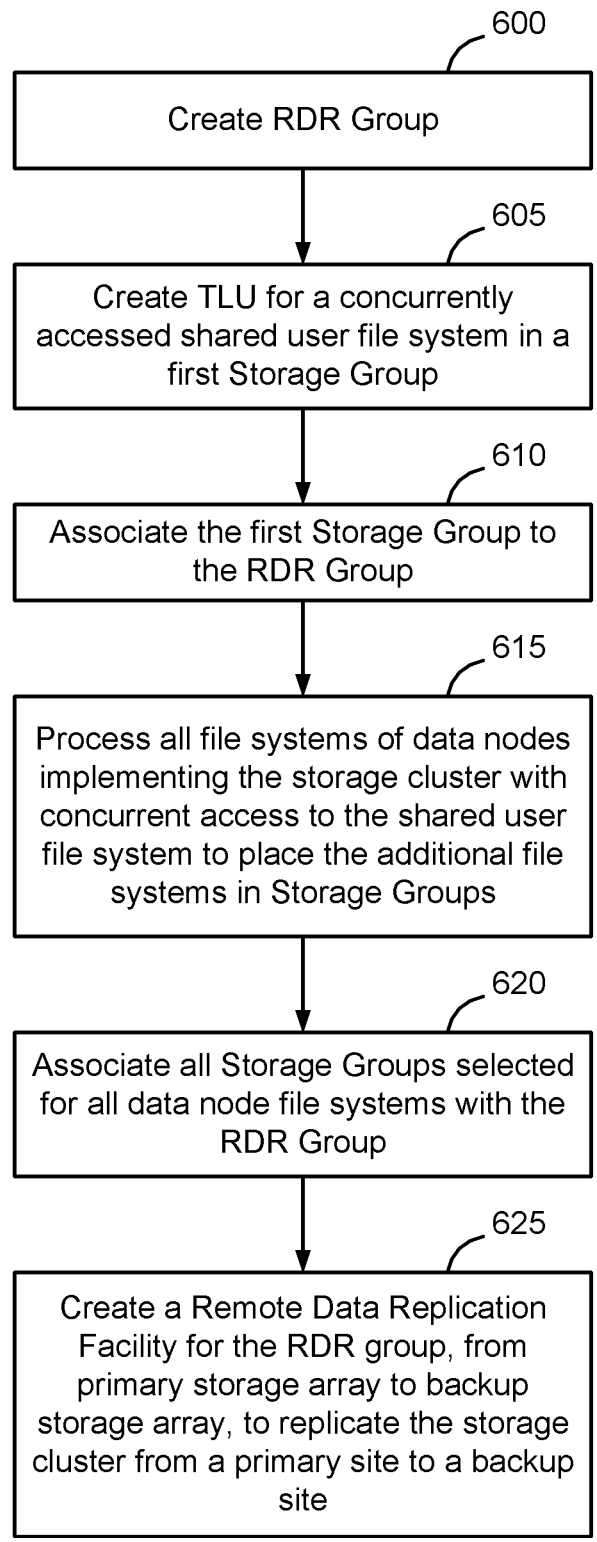
FIGS. 6-7 are flow charts of an example method of replicating a concurrently accessed shared filesystem between storage clusters, according to some embodiments.
Figure 7:
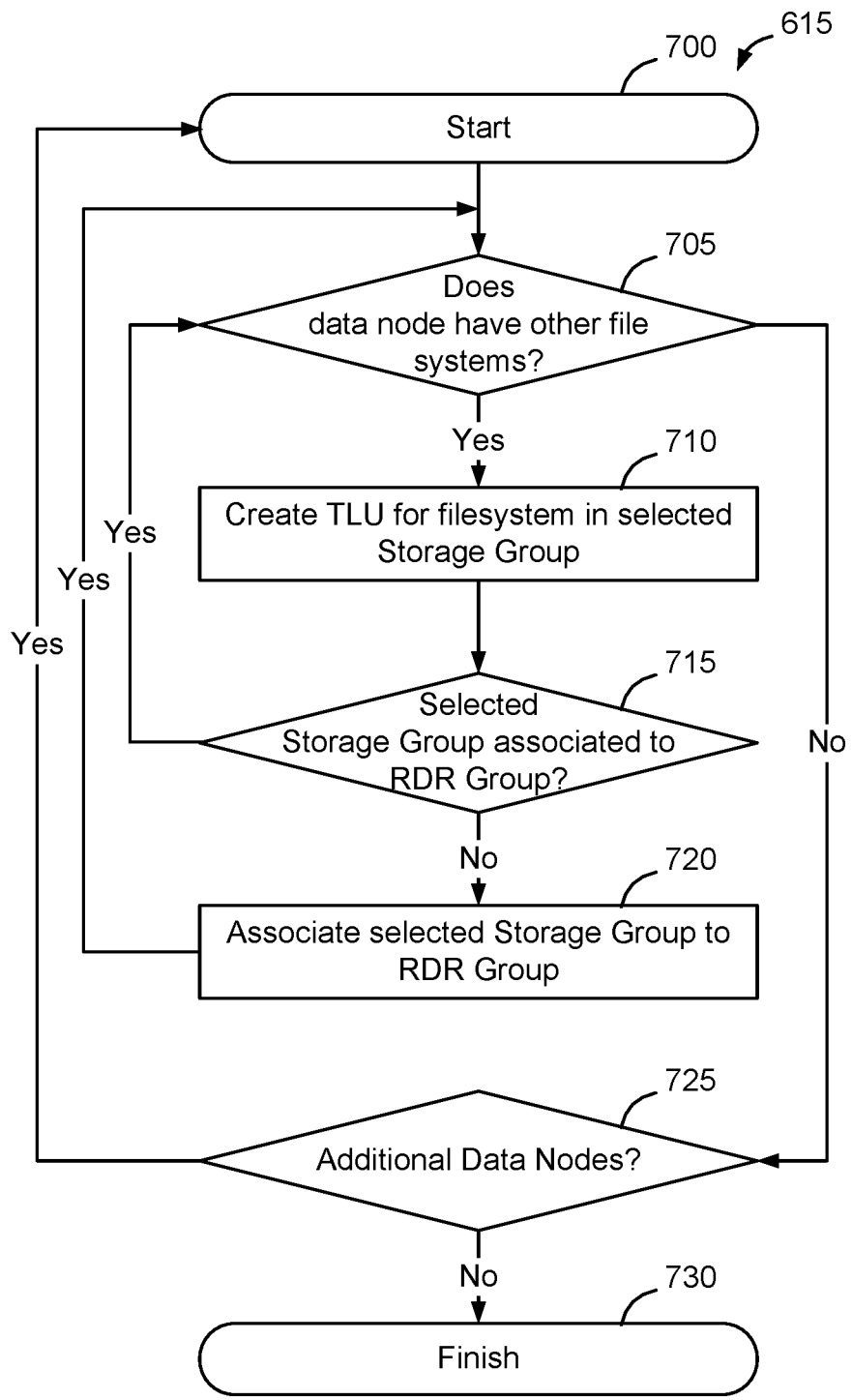

FIGS. 6-7 are flow charts illustrating a method of replicating a concurrently accessed shared filesystem between storage clusters. As shown in FIG. 6, an RDR group is created for the concurrently accessed shared filesystem (block 600). A TLU is then created for the shared concurrently accessed filesystem in a storage group (block 605). The storage group is allocated resources from a storage resource pool of storage resources of a storage array having determined service level objectives for the shared filesystem.

The storage group holding the TLU associated with the concurrently accessed shared filesystem is then associated with the RDF group (block 610). The filesystems of data nodes implementing the storage cluster, which have concurrent access to the shared user filesystem, are then processed to place those filesystems in storage groups (block 615). Block 615 is discussed in greater detail in connection with FIG. 7.

All storage groups selected for all of the data node filesystems are then associated with the RDR group (block 620). A remote data replication facility is then created for the RDR group, from a primary storage array to a backup storage array, to replicate the storage cluster from a primary site to a backup site.

FIG. 7 shows the method of processing filesystems of the data nodes implementing the storage cluster (FIG. 6, block 615) in greater detail. As shown in FIG. 7, the process starts (block 700) with a first of the data nodes 110 by determining if the first selected data node has any other filesystems that are associated with the concurrently accessed shared filesystem. Example filesystems discussed above include the VDM root/configuration filesystem, snapshot copy filesystems, filesystems associated with the system VDM, etc.

If the data node does have an additional filesystem that is associated with the storage cluster (a determination of Yes at block 705), a TLU is selected from a storage group having SLO properties desired by the data node filesystem (block 710). Alternatively, if the filesystem is already assigned to a TLU, an identity of the storage group holding the TLU is retrieved.

Once a storage group has been obtained, a determination is made as to whether the storage group has previously been assigned to the RDR group (block 715). If the storage group has previously been associated to the RDR group (a determination of Yes at block 715), the process returns to block 705 to determine if the data node has any additional filesystems to be processed. If the storage group has not previously been associated to the RDR group (a determination of No at block 715), the selected storage group is associated to the RDR group (block 720), and the process returns to block 705 to determine if the data node has any additional filesystems to be processed.

The process of blocks 705, 710, 715, 720 iterates for each filesystem of the first data node until the first data node does not have any additional filesystems to be processed (a determination of No at block 705). The process then moves to block 725, where a determination is made if there are additional data nodes that have filesystems associated with the storage cluster that need to be processed. If there are additional storage nodes (a determination of Yes at block 725), a second/subsequent data node is selected and the filesystems of the selected data node are processed as described above in connection with blocks 705, 710, 715, 720. This process of selecting data nodes iterates until all data nodes of the storage cluster have been processed (a determination of No at block 725), at which point the process of block 615 finishes (block 730).

The methods described herein may be implemented as software configured to be executed in control logic such as contained in a CPU of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that logic described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible computer readable medium such as random-access memory, a computer memory, a disk, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A non-transitory tangible computer readable storage medium having stored thereon a computer program for implementing a method of replicating a concurrently accessed shared filesystem between storage clusters, the computer program including a set of instructions which, when executed by a computer, cause the computer to perform a method comprising the steps of:

defining a primary storage cluster to include a master node and a plurality of data nodes, each data node having concurrent access to the shared filesystem to provide end users concurrent access to the shared filesystem, each data node having a root filesystem, one or more user filesystems, and a configuration filesystem describing how data of the root filesystem and the one or more user filesystems of the data node are stored in underlying resources of the storage array, each data node having access to the respective one or more user filesystems to provide the end users with access to the respective one or more user filesystems;

creating a first Thin Logical Unit (TLU) for the concurrently accessed shared filesystem;

assigning the first TLU to a first storage group, the first storage group being created from a first storage resource pool of first physical storage resources having a first service level objective;

creating a set of TLUs for each of the root filesystems, each of the configuration filesystems, and each of the user filesystems;

assigning some of the set of TLUs to the first storage group, and assigning some of the set of TLUs to one or more second storage groups, the one or more second storage groups being created from one or more storage resource pools of physical storage resources having one or more service level objectives different than the first service level objective;

creating a Remote Data Replication (RDR) group;

allocating the first storage group and all of the one or more second storage groups to the RDR group to cause the first TLU for the concurrently accessed shared filesystem and the set of TLUs for each of the root filesystems, each of the configuration filesystems, and each of the user filesystems to be included in the RDR group; and creating a Remote Data Replication (RDR) facility for the RDR group, the RDR Facility identifying a first storage array on which the RDR group is implemented and a second storage array to which data stored in the RDR group is to be copied; and mirroring data of the RDR group on the RDR facility from the first storage array to the second storage array to replicate the shared filesystem, each of the root filesystems, each of the configuration filesystems, and each of the user filesystems on the second storage array, to make the shared filesystem, the root and configuration filesystems, and all of the user filesystems, available to a backup set of data nodes with access to the second storage array.

2. The non-transitory tangible computer readable storage medium of claim 1, further comprising:

creating third TLUs for other filesystems of the data nodes of the storage cluster, the other filesystems including snapshot copy filesystems of the concurrently accessed shared filesystem; and assigning the third TLUs to one or more of the second storage groups.

3. The non-transitory tangible computer readable storage medium of claim 1, further comprising:

creating a third TLU for a cluster controller filesystem of a cluster virtual data mover defining membership of the data nodes in the storage cluster, the cluster controller filesystem being implemented as a filesystem of one of the data nodes of the storage cluster; and assigning the third TLU to the first storage group or one of the second storage groups.

4. The non-transitory tangible computer readable storage medium of claim 1, wherein the master node is configured to implement a shared access control process to coordinate access by the data nodes to the concurrently accessed shared filesystem.

5. The non-transitory tangible computer readable storage medium of claim 4, wherein data nodes obtain temporary exclusive access to portions of the concurrently accessed shared filesystem via the shared access control process of the master node.

6. The non-transitory tangible computer readable storage medium of claim 1, wherein a first set of the data nodes of the storage cluster are implemented as processes on a first storage system and a second set of the data nodes of the storage cluster are implemented as processes on a second storage system separate from the first storage system.

7. A method of replicating a concurrently accessed shared filesystem between storage clusters, the method comprising the steps of:

defining a primary storage cluster to include a master node and a plurality of data nodes, each data node having concurrent access to the shared filesystem to provide end users concurrent access to the shared filesystem, each data node having a root filesystem, one or more user filesystems, and a configuration filesystem describing how data of the root filesystem and the one or more user filesystems of the data node are stored in underlying resources of the storage array, each data node having access to the respective one or more user filesystems to provide the end users with access to the respective one or more user filesystems;

creating a first Thin Logical Unit (TLU) for the concurrently accessed shared filesystem;

assigning the first TLU to a first storage group, the first storage group being created from a first storage resource pool of first physical storage resources having a first service level objective;

creating a set of TLUs for each of the root filesystems, each of the configuration filesystems, and each of the user filesystems;

assigning some of the set of TLUs to the first storage group, and assigning some of the set of TLUs to one or more second storage groups, the one or more second storage groups being created from one or more second storage resource pools of physical storage resources having one or more service level objectives different than the first service level objective;

creating a Remote Data Replication (RDR) group;

allocating the first storage group and all of the one or more second storage groups to the RDR group to cause the first TLU for the concurrently accessed shared filesystem and the set of TLUs for each of the root filesystems, each of the configuration filesystems, and each of the user filesystems to be included in the RDR group; and creating a Remote Data Replication (RDR) facility for the RDR group, the RDR Facility identifying a first storage array on which the RDR group is implemented and a second storage array to which data stored in the RDR group is to be copied; and mirroring data of the RDR group on the RDR facility from the first storage array to the second storage array to replicate the shared filesystem, each of the root filesystems, each of the configuration filesystems, and each of the user filesystems on the second storage array, to make the shared filesystem, the root and configuration filesystems, and all of the user filesystems, available to a backup set of data nodes with access to the second storage array.

8. The method of claim 7, further comprising:

creating third TLUs for other filesystems of the data nodes of the storage cluster, the other filesystems including snapshot copy filesystems of the concurrently accessed shared filesystem; and assigning the third TLUs to one or more of the second storage groups.

9. The method of claim 7, further comprising:

creating a third TLU for a cluster controller filesystem of a cluster virtual data mover defining membership of the data nodes in the storage cluster, the cluster controller filesystem being implemented as a filesystem of one of the data nodes of the storage cluster; and assigning the third TLU to the first storage group or one of the second storage groups.

10. The method of claim 7, wherein the master node is configured to implement a shared access control process to coordinate access by the data nodes to the concurrently accessed shared filesystem.

11. The method of claim 10, wherein data nodes obtain temporary exclusive access to portions of the concurrently accessed shared filesystem via the shared access control process of the master node.

12. The method of claim 7, wherein a first set of the data nodes of the storage cluster are implemented as processes on a first storage system and a second set of the data nodes of the storage cluster are implemented as processes on a second storage system separate from the first storage system.

* * * * *